United States Patent
Kazuma (10) Patent No.: US 7,304,459 B2
(45) Date of Patent: Dec. 4, 2007

(54) SYNCHRONOUS RECTIFICATION MODE DC-TO-DC CONVERTER POWER SUPPLY DEVICE

(75) Inventor: Shuji Kazuma, Yawata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 220 days.

(21) Appl. No.: 10/538,051

(22) PCT Filed: Nov. 11, 2003

(86) PCT No.: PCT/JP03/14301

§ 371 (c)(1),
(2), (4) Date: Jun. 8, 2005

(87) PCT Pub. No.: WO2004/054076

PCT Pub. Date: Jun. 24, 2004

(65) Prior Publication Data

US 2006/0109697 A1    May 25, 2006

(30) Foreign Application Priority Data

Dec. 10, 2002    (JP) .............................. 2002-357568

(51) Int. Cl.
*G05F 1/40* (2006.01)

(52) U.S. Cl. .................................................. 323/282

(58) Field of Classification Search ................ 323/273, 323/274, 280, 281, 282, 285, 351
See application file for complete search history.

(56) References Cited

U.S. PATENT DOCUMENTS

| | | | | |
|---|---|---|---|---|
| 6,104,759 A | * | 8/2000 | Carkner et al. | ............. 375/295 |
| 6,147,477 A | | 11/2000 | Saeki et al. | |
| 6,229,289 B1 | * | 5/2001 | Piovaccari et al. | ......... 323/268 |

FOREIGN PATENT DOCUMENTS

| | | |
|---|---|---|
| JP | 60-255057 A | 12/1985 |
| JP | 62-029784 | 2/1987 |
| JP | 08-242577 A | 9/1996 |
| JP | 09-261950 | 10/1997 |
| JP | 2000-156970 A | 6/2000 |
| JP | 2002-119058 A | 4/2002 |
| JP | 2002-159173 A | 5/2002 |

OTHER PUBLICATIONS

International Search Report for application No. PCT/JP2003/014301 dated Feb. 17, 2004.

* cited by examiner

*Primary Examiner*—Adolf Berhane
(74) *Attorney, Agent, or Firm*—RatnerPrestia (57) ABSTRACT

A DC-to-DC converter power supply device includes drive circuits for generating different drive waveforms from a drive pulse of an oscillation control circuit portion; a first switching element driven by a drive circuit; a second switching element driven by a drive circuit; and a third switching element connected in parallel to a second diode of the second switching element and driven by the drive circuit.

7 Claims, 5 Drawing Sheets

SYNCHRONOUS RECTIFICATION MODE DC-TO-DC CONVERTER POWER SUPPLY DEVICE

This Application is a U.S. national phase Application of PCT International Application PCT/JP03/14301.

TECHNICAL FIELD

The present invention relates to a DC-to-DC converter power supply used in electronic equipment such as televisions, VTRs, cameras, personal computers and peripheral equipment thereof to stabilize the output voltage by controlling the pulse width.

BACKGROUND ART

Figure 4:
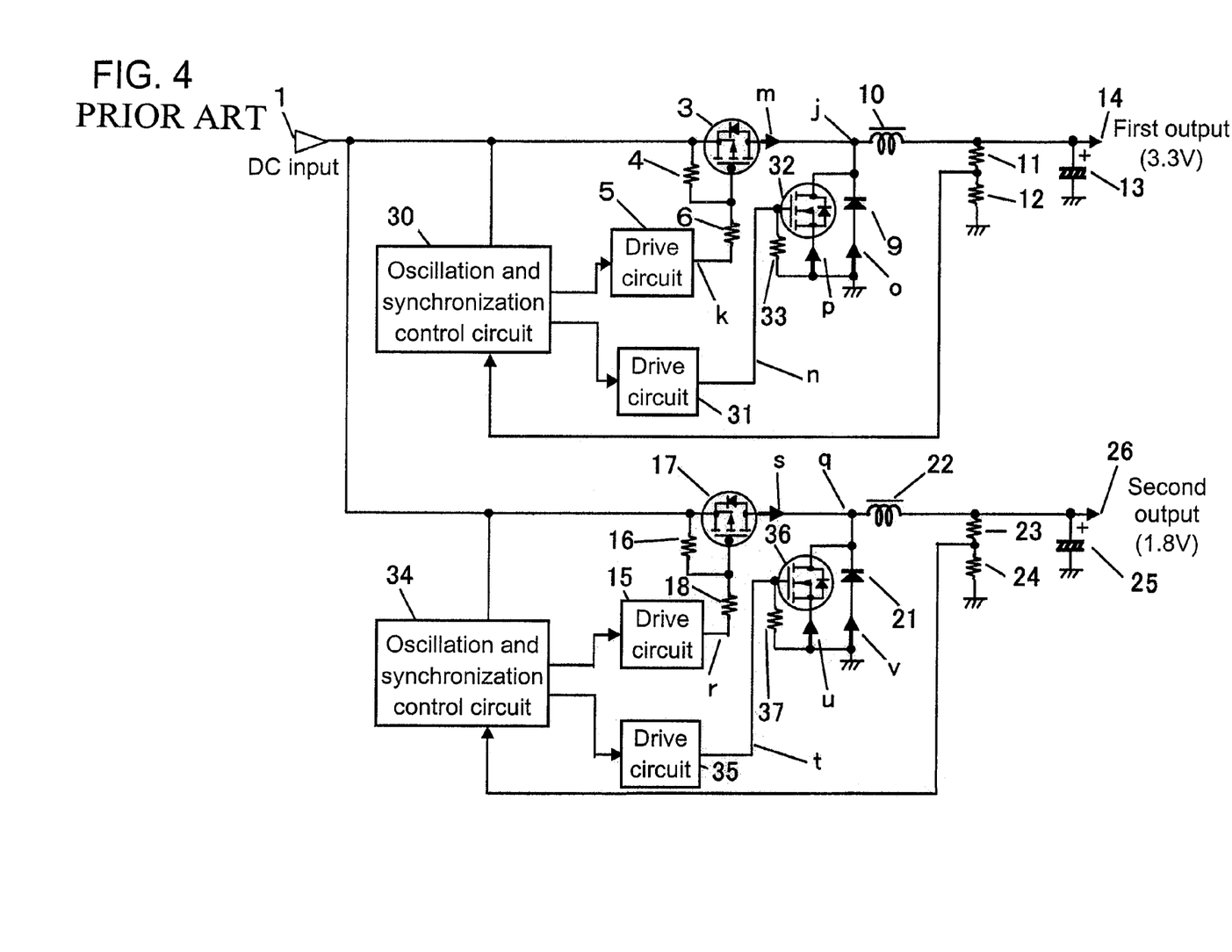
FIG. 4 is a diagram showing a conventional synchronous rectification mode DC-to-DC converter power supply device.
Figure 5:
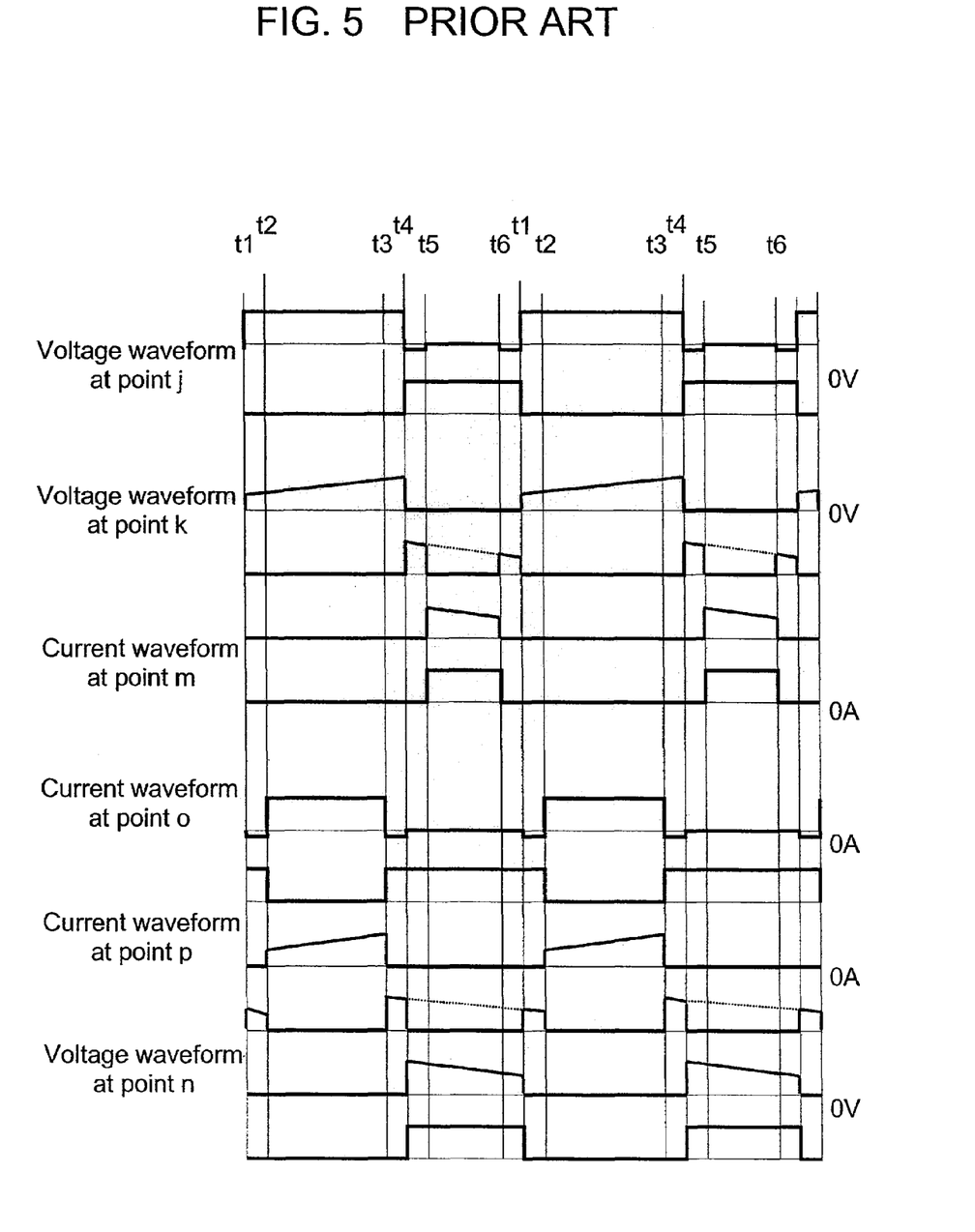
FIG. 5 shows main timing charts of waveforms of a conventional synchronous rectification mode DC-to-DC converter power supply device.

Recently, a DC-to-DC converter power supply for stabilizing the output voltage by controlling the pulse width has been widely used in electronic equipment. Furthermore, in order to achieve higher efficiency, also a synchronous rectification mode DC-to-DC converter power supply for reducing the loss of the forward voltage of a rectifying diode has been used in various cases in accordance with increased development of IC control circuits (see, for example, patent document 1: Japanese Patent Unexamined Publication No. 09-261950). FIG. 4 is a circuit diagram showing an example of a conventional DC-to-DC converter power supply; and FIG. 5 shows timing charts of main waveforms thereof. FIG. 4 shows an example of a case in which 3.3 V output and 1.8 V output are obtained from one DC input. Firstly, a 3.3 V output system is described.

When a DC voltage (for example, 5V to 10V of DC) is applied to DC input 1, oscillation and synchronization control circuit 30 that is a control IC starts to operate, further, drive circuit 5 is driven and P-channel MOS-FET 3 that is a switching element (hereinafter, abbreviated as MOS-FET 3) is driven. The drive waveform thereof is a voltage waveform at point k in FIG. 5 and the voltage at high level (time from t4 to t1) is substantially the same as that of DC input 1. Oscillation and synchronization control circuit 30 used herein is an IC having a special specification in which two kinds of drive pulses as shown in waveforms at points k and n in FIG. 5 are used with one-channel output, and these two drive pulses set dead time (which means a time when both two drives are turned OFF) in consideration of the rise time and the fall time of ON/OFF of MOS-FET to be driven respectively.

MOS-FET 3 is turned ON when gate voltage k is at low level (t1 to t4) and is turned OFF when gate voltage k is at high level (t4 to t1). Therefore, the output voltage of MOS-FET 3 is a voltage having a voltage waveform at point j in FIG. 5. This voltage is applied to coil 10. An electric current flowing in coil 10 during an ON period (t1 to t4) of MOS-FET 3 is an electric current having a current waveform at point m (time from t1 to t4) in FIG. 5. When an inductance value of coil 10 is small, the slope is steep and the peak value of the electric current becomes large. On the other hand, when an inductance value of coil 10 is large, the slope is gentle and the peak value of the electric current becomes small. In any case, it is necessary to select the inductance value of coil 10 so that the core of the coil is not saturated.

When MOS-FET 3 is turned OFF, the electric current flowing in coil 10 is not supplied, so that a counter electromotive force is generated at both ends of coil 10 and the potential at point j becomes negative and is clamped at the forward voltage of diode 9. As a result, energy accumulated in coil 10 becomes an electric current, and the electric current flows through loads (not shown) connected to capacitor 13 and first output 14 and diode 9. This electric current is called a reflux current and the loss thereof is reduced as a forward voltage of diode 9 is lower. Therefore, a schottky-barrier diode (hereinafter, referred to as SBD) is often used. In this case, however, the forward voltage is about 0.3V to 0.6V.

Therefore, during an ON period (t4 to t1) of diode 9, an element having a forward voltage lower than that of diode 9, that is, having a smaller loss is used to turn ON so as to allow a reflux current to bypass, thereby enabling the loss to be further reduced. This can be realized by forming a bypass circuit as follows. N-channel MOS-FET 32 that is a switching element (hereinafter, referred to as MOS-FET 32) is turned ON with the voltage waveform from t5 to t6 at point n by drive circuit 31. In general, in MOS-FET 32, voltage drop during an ON period can be expected to be 0.1V or less. Since it is lower than the forward voltage of diode 9 (0.3V to 0.6V), during the time, the reflux current flows through MOS-FET 32. This is described with reference to FIG. 5. The output waveform of drive circuit 31 is a voltage waveform at point n, and MOS-FET 32 is turned OFF at low level (t6 to t5). At this time, an electric current flows in diode 9 at the time from t4 to t5 and time from t6 to t1 as shown in the current waveform at point o. Furthermore, when the output of drive circuit 31 is at high level (t5 to t6), MOS-FET 32 is turned ON, and an electric current flows during the time from t5 to t6 as shown in the current waveform at point p.

Then, when looking at a portion at low level (t4 to t1) of the voltage waveform at point j, in the timings when diode 9 is ON, i.e., the timings from t4 to t5 and from t6 to t1, the voltage level of the forward voltage is between about –0.3V and –0.6V. On the other hand, in the timing when MOS-FET 32 is ON, i.e., the timing when an electric current is flowing in point p (t5 to t6), the voltage level is about –0.1V.

Then, by dividing and detecting the 3.3V output voltage with the use of resistors 11 and 12 and feeding back the voltage to oscillation and synchronization control circuit 30, the ON period of MOS-FET 3 is controlled and at the same time the ON period of MOS-FET 32 is controlled so as to carry out an operation so that the output is kept constant. Therefore, the shorter the period when an electric current flows in diode 9 is, the less the loss is and higher efficiency can be achieved. On the other hand, the ON period of MOS-FET 3 and the ON period of MOS-FET 32 coincide with each other, a large current flows, which may lead to destruction of the switching element. Therefore, care should be taken.

The basic operation of the 1.8V system output is the same as that of the 3.3V system output mentioned above, and thus the description therefor is omitted herein.

However, this conventional synchronous rectification mode DC-to-DC converter power supply, in which a plurality of outputs with different voltages are obtained from one input, has disadvantages that it is necessary to construct circuits respectively for each output system by using an oscillation and synchronization control circuit, a drive circuit and MOS-FET, and the like, thus increasing the circuit size. Another disadvantage is that in order to allow a plurality of drive circuits to be synchronized and controlled, it is necessary to use a special-purpose control IC as an oscillation and synchronization control circuit, thus increasing the cost.

SUMMARY OF THE INVENTION

A synchronous rectification mode DC-to-DC converter power supply device, including a first switching power supply means; and a second switching power supply means for carrying out synchronous rectification based on a drive pulse of the first switching power supply means. The first switching power supply means includes an oscillation control means operating by a DC input power supply and outputting a drive pulse; a first drive means for outputting a drive waveform based on the drive pulse from the oscillation control means; a first switching element being driven by the output of the first drive means; a first rectifying means having a positive electrode being grounded and a negative electrode being connected to the output of the first switching element; and a first coil being connected to the output of the first switching element. The second switching power supply means includes a second drive means for outputting a drive waveform based on the drive pulse from the oscillation control means; a second switching element being driven by the output of the second drive means; a second rectifying means having a positive electrode being ground and a negative electrode being connected to the output of the second switching element; a third switching element being connected in parallel to the second rectifying means and driven by the output of the first drive means; and a second coil being connected to the output of the second switching element.

DETAILED DESCRIPTION OF THE PREFERRED EMBODIMENT

Hereinafter, exemplary embodiments of the present invention are described with reference to FIGS. 1 to 3.

First Exemplary Embodiment

Figure 1:
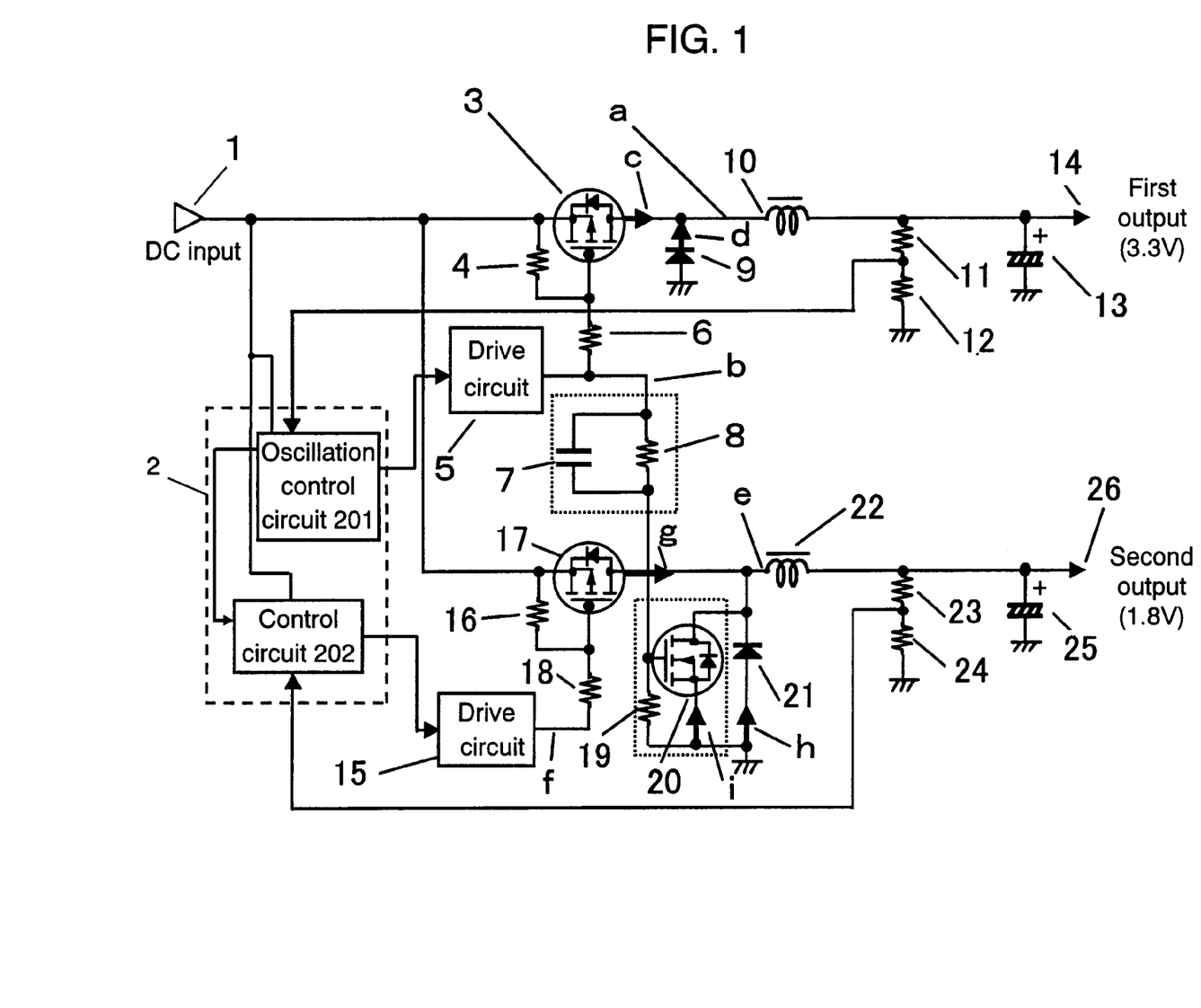
FIG. 1 is a diagram showing a synchronous rectification mode DC-to-DC converter power supply device in accordance with a first exemplary embodiment of the present invention.

FIG. 1 shows a first exemplary embodiment. A synchronous rectification mode of the first exemplary embodiment has a configuration in which two DC outputs are obtained from one DC input and a drive pulse of a 3.3V system first switching power supply means synchronously rectifies a 1.8V system second switching power supply means.

In FIG. 1, elements that are the same as or have the same functions as those in FIG. 4 are given the same reference numerals. Furthermore, waveforms at points a to i in FIG. 2 show timing charts of waveforms of main portions in FIG. 1. Furthermore, in the case of current waveform, the direction in which an electric current flows is indicated by an arrow.

Hereinafter, an operation of a synchronous rectification mode DC-to-DC converter power supply according to the first exemplary embodiment is described in detail. Firstly, a first switching power supply means for generating first output 14 from DC input 1 is described. When a DC voltage (for example, 5V to 10V of DC) is applied to DC input 1, oscillation control circuit 201 constructed in oscillation control circuit portion 2 starts to operate and drive circuit 5 is driven. The output therefrom drives P-channel first MOS-FET 3. Since oscillation control circuit 201 outputs only one kind of drive pulse as shown in point b in FIG. 2, it is distinguished from conventional oscillation and synchronization control circuit 30. Furthermore, with such a simple configuration, it is possible to use a low-cost and general-purpose control IC.

Figure 2:
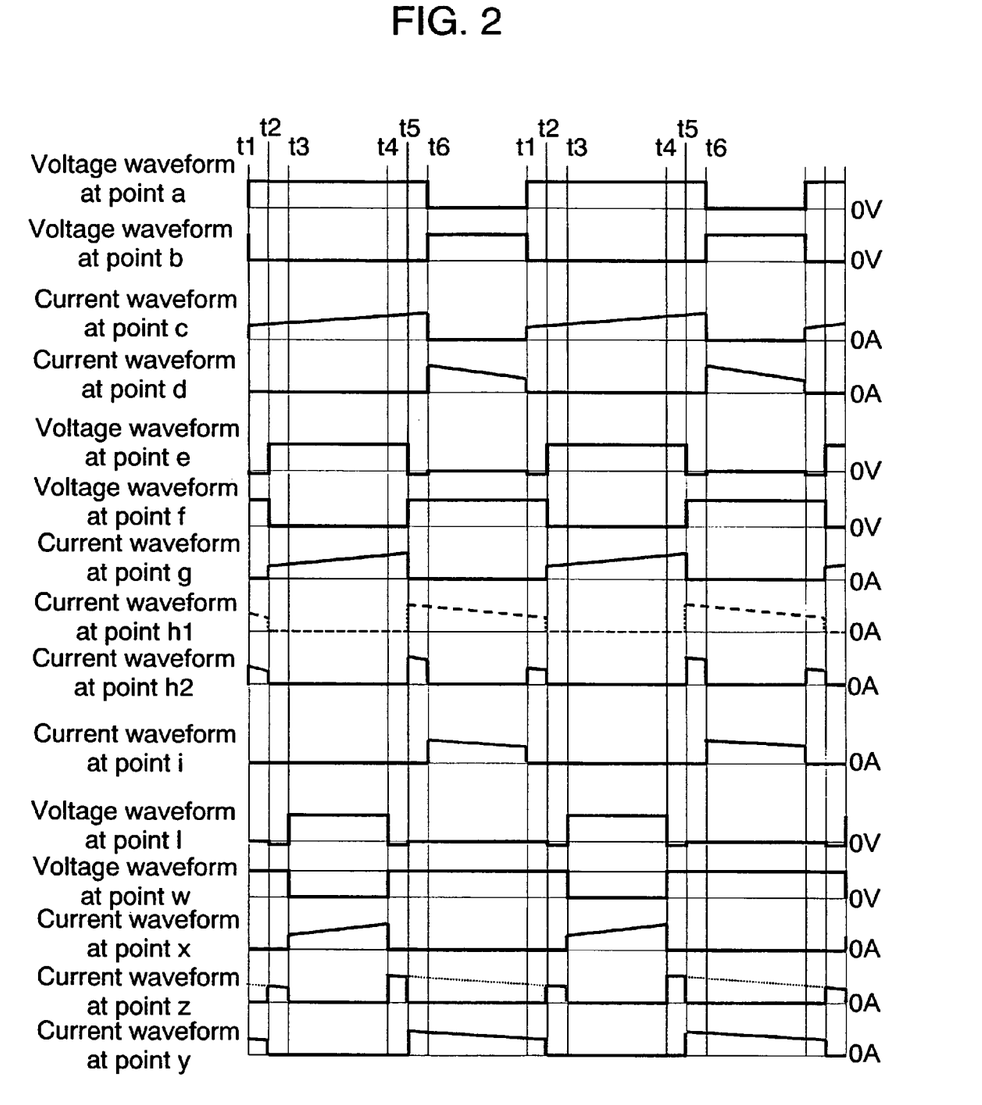
FIG. 2 shows main timing charts of waveforms of the synchronous rectification mode DC-to-DC converter power supply device in accordance with the first exemplary embodiment of the present invention.

A first drive waveform that is an output waveform of first drive circuit 5 is a voltage waveform at point b in FIG. 2 and a voltage at high level (t6 to t1) is substantially the same voltage as that of DC input 1. First MOS-FET 3 is turned ON when gate voltage b is at low level (t1 to t6) and turned OFF when gate voltage b is at high level (t6 to t1). Therefore, the output voltage of first MOS-FET 3 is shown in the voltage waveform at point a in FIG. 2. Then, the output of first MOS-FET 3 is applied to first coil 10. An electric current flowing during an ON period of first MOS-FET 3 is shown in the current waveform (t1 to t6) at point c in FIG. 2. When an inductance value of coil 10 is small, the slope is steep and the peak value of the electric current becomes large. On the other hand, when an inductance value of coil 10 is large, the slope is gentle and the peak value of the electric current becomes small. In any case, it is necessary to select the inductance value so that the core of first coil 10 is not saturated.

When first MOS-FET 3 is turned OFF, since the electric current flowing in coil 10 is not supplied, a counter electromotive force is generated at both ends of coil 10 and the potential at point a is becoming negative. However, since an electric current flows through first diode 9, the electric potential is kept (clamped) at substantially 0V (actually about –0.3V to –0.6V) as shown in the voltage waveform (t6 to t1) at point a in FIG. 2. As a result, energy accumulated in first coil 10 becomes an electric current, the electric current flows through loads of first capacitor 13 and first output and first diode 9. This electric current is called a reflux current. The loss thereof is reduced as a forward voltage of diode 9 is lower. Then, by dividing and detecting the voltage by the use of first detection circuit composed of first resistors 11 and 12 and feeding the voltage back to oscillation control circuit 2, an ON period (t1 to t6) of first MOS-FET 3 is controlled, so that a 3.3V output 14 is controlled to be kept constant.

Next, a second switching power supply means for generating second output 26 from DC input 1 is described. Similar to the first switching power supply means, oscillation control circuit 201 constructed in oscillation control circuit portion 2 starts to operate and oscillation signal is input. Control circuit 202 which operates in the same frequency drives second drive circuit 15, and the output therefrom drives P-channel second MOS-FET 17.

The output of the second drive circuit has a voltage waveform shown at point f in FIG. 2 and a voltage at high level (t5 to t2) is substantially the same as the voltage of DC input 1. Furthermore, the voltage waveform at point f operates phase-synchronously to the voltage waveform at point b of first switching power supply means. Since the output of the second switching power supply means is 1.8V, an ON period is shorter at point f as compared with that at point b. Second MOS-FET 17 is turned ON when gate voltage f is at low level (t2 to t5) and turned OFF when gate voltage f is at high level (t5 to t2). The output voltage of second MOS-FET 17 has a voltage waveform shown at point e in FIG. 2, in which a time from t2 to t5 is an ON period and a time from t5 to t2 is an OFF period. In more detail, during times from t5 to t6 and from t1 to t2, electric current flows in diode 21 and the voltage at that time is about −0.3V to −0.6V. On the other hand, during the time from t6 to t1, N-channel third MOS-FET 20 is tuned ON and the voltage is about −0.1V. This voltage (t2 to t5) is applied to second coil 22. An electric current flowing during the ON period of second MOS-FET 17 is shown in a current waveform (t2 to t5) at point g in FIG. 2. When an inductance value of second coil 22 is small, the slope of the waveform is steep and the peak value of the electric current becomes large. On the other hand, when an inductance value of second coil 22 is large, the slope of the waveform becomes gentle and the peak value of the electric current becomes small. In any case, it is necessary to select the inductance value so that the core of the second coil is not saturated.

Note here that when second MOS-FET 17 is turned OFF (t5 to t2), the electric current flowing in second coil 22 is not supplied, so that a counter electromotive force is generated at both ends of second coil 22. Then, the potential at point e is becoming negative. However, since an electric current flows through first diode 21, the electric potential is kept (clamped) at substantially 0V (actually about −0.3V to −0.6V) as shown in the voltage waveform (t5 to t2) at point e in FIG. 2. As a result, energy accumulated in second coil 22 becomes electric current, and a reflux current flows through loads of second smoothing capacitor 25 and second output and second diode 21. The loss of the reflux current is reduced as the forward voltage of second diode 21 becomes lower.

To second diode 21, third MOS-FET 20 is connected in parallel. To a gate of third MOS-FET 20, via a waveform shaping circuit composed of capacitor 7 and resistor 8, output of first drive circuit 5 is connected. Needless to say, the same effect can be obtained even in the case where the waveform shaping circuit is omitted and third MOS-FET 20 is directly driven by the output of first drive circuit 5. However, from the viewpoint that optimal drive conditions can be adjusted easily, the waveform shaping circuit is useful.

With this configuration, N-channel third MOS-FET 20 is turned ON when a voltage waveform at point b is at high level (t6 to t1) and is turned OFF when the voltage waveform is at low level (t1 to t6). If third MOS-FET 20 is kept OFF, an electric current having the waveform shown by a dotted line at point h1 in FIG. 2 flows in diode 21, resulting in that a voltage at point e is always about −0.3V to −0.6V during this time (t1 to t6). However, when ON/OFF of third MOS-FET 20 is controlled, an electric current having the waveform shown at point h2 flows in second diode 21 and an electric current having the waveform shown at point i (t6 to t1) flows in third MOS-FET 20. That it to say, the electric current at point h1 flowing in second diode 21 is allowed to bypass to third MOS-FET 20 during the time when third MOS-FET 20 is turned ON (t6 to t1). As a result, the voltage waveform at point e becomes about −0.1V during a time from t6 to t1 as shown in FIG. 2, and it is possible to reduce the loss owing to high voltage of the forward voltage of diode 21, thus achieving high efficiency of the circuit.

Then, by dividing and detecting the voltage by the use of second detecting resistors 23 and 24 and feeding back the voltage to control circuit 202, an ON period (t2 to t5) of second MOS-FET 17 is controlled, so that a 1.8V output 26 is controlled to be kept constant.

Note here that the less an electric current flows in the diode 21, the less the loss is and higher efficiency can be achieved. Therefore, it is desirable that drive circuits 5 and 15 are configured so that the periods from t5 to t6 and from t1 to t2 are shorter. However, they should be configured under the following conditions: in the transition state in which each MOS-FET is changed between ON and OFF, dead time (which means a time when both drives are in OFF) is set in consideration of the rise time and the fall time of ON/OFF of MOS-FETs to be driven respectively. When the ON period of second MOS-FET 17 and the ON period of third MOS-FET 20 coincide with each other, a large current flows, which may lead to destruction of the switching element. Therefore, care should be taken. This means that the synchronous rectification mode of the first exemplary embodiment is applied to a 1.8V system. On the contrary, however, it is not possible to synchronously rectify a 3.3V system by the drive pulse of a 1.8V system, because the ON period of MOS-FET 3 and the ON period of MOS-FET 32 coincide with each other as shown in FIG. 6 of a conventional example.

As mentioned above, in the first exemplary embodiment, a circuit can be shared by a plurality of output channels. As a result, the circuit size can be reduced. Furthermore, the loss owing to high forward voltage of a diode can be reduced by MOS-FET connected in parallel, thus achieving high efficiency in a circuit. Furthermore, this configuration has an effect that since it is sufficient that only one kind of drive pulse is output as an output of the oscillation control circuit, a multi-channel DC-to-DC converter power supply can be configured by using a low-cost and general-purpose control IC instead of an expensive and special-purpose control IC and thus synchronous rectification mode can be achieved easily.

Note here that in addition to the configuration of the first exemplary embodiment, there is another configuration in which, in a 3.3V system first switching power supply means, N-channel sixth MOS-FET is connected in parallel to diode 9 that is a first rectifying means, and an output of the other oscillation control circuit constructed in oscillation control circuit portion 2 is connected to a gate of N-channel sixth MOS-FET, thereby improving the efficiency of the 3.3V system of first switching power supply means. This has an effect that the loss owing to a high voltage of a forward voltage of diode can be reduced, thus achieving higher efficiency than that of the first exemplary embodiment.

Second Exemplary Embodiment

Figure 3:
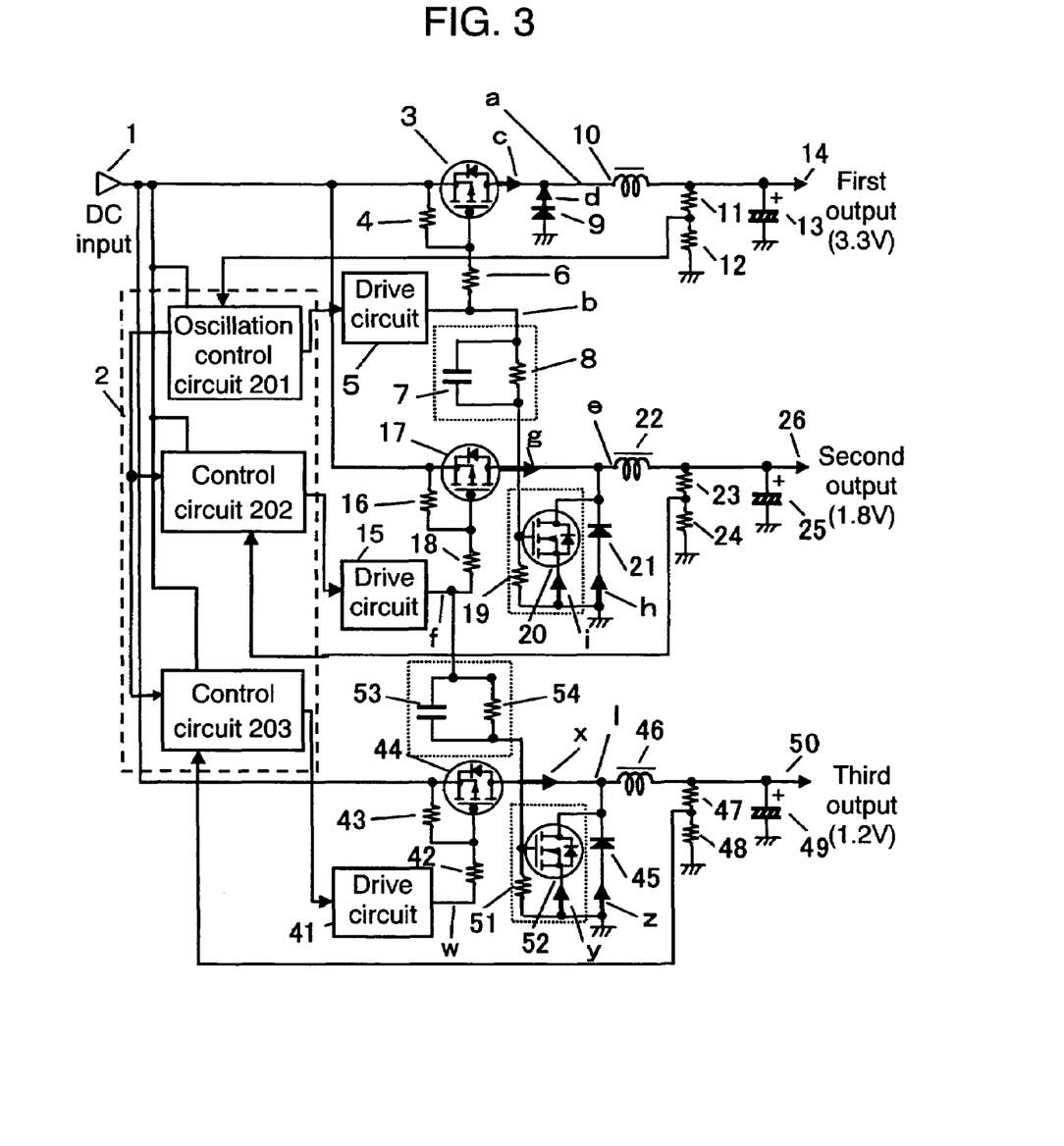
FIG. 3 is a diagram showing a synchronous rectification mode DC-to-DC converter power supply device in accordance with a second exemplary embodiment of the present invention.

FIG. 3 shows a second exemplary embodiment of the present invention. A synchronous rectification mode of the second exemplary embodiment has a configuration in which three DC outputs are obtained from one DC input. In this configuration, in addition to the configuration of the first exemplary embodiment, further a 1.2V system third switching power supply means is synchronously rectified by a drive pulse of a 1.8V system second switching power supply means.

Waveforms from points a to z in FIG. 2 show timing charts of waveforms of main portions in FIG. 3. In FIG. 3, elements that are the same as or have the same functions as those in FIG. 1 are given the same reference numerals. Furthermore, the synchronous rectification mode DC-to-DC converter power supply of the second exemplary embodiment includes third drive circuit 41, resistors 42 and 43, P-channel fourth MOS-FET 44 that is a fourth switching element (hereinafter, abbreviated as fourth MOS-FET 44), third diode 45, third coil 46, third detection resistors 47 and 48, third smoothing capacitor 49, third output 50, resistor 51, N-channel fifth MOS-FET 52 of a fifth switching element (hereinafter, abbreviated as fifth MOS-FET 52), capacitor 53 and resistor 54 in addition to the first exemplary embodiment.

Hereinafter, an operation of the synchronous rectification mode DC-to-DC converter power supply according to the second exemplary embodiment is described in detail. The operations of the first switching power supply means and the second switching means are the same as those in the first exemplary embodiment, and therefore, the descriptions therefor are omitted. A third switching power supply means for generating third output 50 from DC input 1 is described. The operation of the third switching power supply means is basically the same as that of the second switching power supply means. Firstly, oscillation control circuit 201 constructed in oscillation control circuit portion 2 starts to operate, and the oscillation signal therefrom is input. Third drive circuit 41 is driven by control circuit 203 operating in the same frequency and P-channel fourth MOS-FET 44 is driven. The output of the third drive circuit is a voltage waveform at point w in FIG. 2. Furthermore, the output voltage of fourth MOS-FET 44 has a voltage waveform at point 1 in FIG. 2, which is applied to third coil 46.

When fourth MOS-FET 44 is turned OFF, since the electric current flowing in third coil 46 is not supplied, a counter electromotive force is generated at both ends of third coil 46 and a potential at point 1 becomes negative and clamped at a forward voltage of third diode 45. As a result, a reflux current flows through loads of third smoothing capacitor 49 and third output and third diode 45.

To third diode 45, N-channel fifth MOS-FET 52 is connected in parallel. Fifth MOS-FET 52 is connected to second drive 15 via a waveform shaping circuit composed of capacitor 53 and resistor 54 so that an ON period (t5 to t2) is controlled. With this configuration, drive voltage having a waveform that is similar to that at point f in FIG. 2 is applied to a gate of fifth MOS-FET 52. As a result, fifth MOS-FET 52 is turned ON when the voltage waveform at point f is at high level (t5 to t2) and turned OFF when a voltage waveform is at low level (t2 to t5). An electric current flows in third diode 45 during the period of time from t4 to t5 and from t2 to t3 at point z and is allowed to bypass to fifth MOS-FET 52 during an ON period (t5 to t2) of fifth MOS-FET 52 as shown by point y. Then, by dividing and detecting the voltage by the use of third detection resistors 47 and 48 and feeding back the voltage to oscillation control circuit 2, an ON period of fourth MOS-FET 44 is controlled, so that 1.2V output 50 is controlled to be kept constant.

As mentioned above, in the second exemplary embodiment, the same effect can be obtained even when three-channel output is used as an output channel.

Note here that, in the second exemplary embodiment, fifth MOS-FET 52 of a third switching power supply means is driven by second drive circuit 15 of the second switching power supply means, but it may be driven by first drive circuit 5 of the first switching power supply means. However, the circuit having a configuration mentioned in the second exemplary embodiment is highly efficient and more desirable. Hereinafter, the reason therefor is described. The period of time when a reflux current flowing in third diode 45 depends upon the period when fifth MOS-FET 52 is turned ON. Furthermore, when first output 14 is set to 3.3V and second output 26 is set to 1.8V, the driving period, that is, the period when voltage becomes at high level is longer in the second drive circuit 15 as shown in the waveforms at points b and f. Therefore, in order to allow a larger amount of reflux current flowing in the third diode 45 to bypass, it is desirable to carry out driving by the use of second drive circuit 15 of the second switching power supply means.

Note here that it can be easily understood that even in a case where more output, lower voltage and larger amount of current are required, the configuration of the present invention can be achieved by synchronizing an oscillation control circuit. Furthermore, the configuration of the present invention can be achieved by a low-cost control IC without requiring expensive and special-purpose control IC for synchronous rectification.

As described above, according to the present invention, a circuit can be shared by a plurality of output channels and one oscillation control circuit portion, resulting in reducing the circuit size. Furthermore, the configuration of the present invention has an effect that since it is sufficient that one kind of drive pulse is output as an output of oscillation control circuit portion, a multi-channel DC-to-DC converter power supply can be configured by a low-cost general-purpose control IC instead of an expensive special-purpose control IC, and thus synchronous rectification mode can be achieved easily.

INDUSTRIAL APPLICABILITY

A DC-to-DC converter power supply is used in electronic equipment such as televisions, VTRs, cameras, personal computers and peripheral equipment thereof to stabilize the output voltage by controlling the pulse width. A synchronous rectification mode DC-to-DC converter power supply device is provided with low cost and high efficiency.

The invention claimed is:

1. A synchronous rectification mode DC-to-DC converter power supply device, comprising:
    a first switching power supply circuit; and
    a second switching power supply circuit for carrying out synchronous rectification based on a drive pulse of the first switching power supply circuit, wherein
    the first switching power supply circuit comprises:
        an oscillation control circuit operating by a DC input power supply and outputting a drive pulse;
        a first drive circuit for outputting a drive voltage based on the drive pulse from the oscillation control circuit;
        a first switching element being driven by the output of the first drive circuit;
        a first rectifying circuit having a positive electrode being grounded and a negative electrode being connected to the output of the first switching element; and
        a first coil being connected to the output of the first switching element; and
    the second switching power supply circuit comprises:
        a second drive circuit for outputting a drive voltage based on the drive pulse from the oscillation control circuit;
        a second switching element being driven by the output of the second drive circuit;

a second rectifying circuit having a positive electrode being ground and a negative electrode being connected to the output of the second switching element;

a third switching element being connected in parallel to the second rectifying circuit and driven by the output of the first drive circuit; and a second coil being connected to the output of the second switching element; and wherein the third switching element is turned on during an OFF period of the first switching element and turned off during an ON period of the first switching element.

2. The synchronous rectification mode DC-to-DC converter power supply device according to claim 1, wherein an OFF period of the second switching element longer than the OFF period of the first switching element, a timing when the first switching element is turned off is later than a timing when the second switching element is turned off, and a timing when the second switching element is turned on is later than a timing when the first switching element is turned on.

3. The synchronous rectification mode DC-to-DC converter power supply device according to claim 1, further comprising a third switching power supply circuit for carrying out synchronous rectification based on the drive pulse of the second switching power supply circuit, wherein the third switching power supply circuit comprises:

a third drive circuit for outputting a drive voltage based on the drive pulse from the oscillation control circuit;

a fourth switching element driven by the output of the third drive circuit;

a third rectifying circuit having a positive electrode being grounded and a negative electrode being connected to the output of the fourth switching element;

a fifth switching element being connected in parallel to the third rectifying circuit and being driven by the output of the second drive circuit; and a third coil connected to an output of the fourth switching element wherein the fifth switching element is turned on during an OFF period of the second switching element and turned off during an ON period of the second switching element.

4. The synchronous rectification mode DC-to-DC converter power supply device according to claim 3, wherein, an OFF period of the fourth switching element longer than the OFF period of the second switching elements, a timing when the second switching element is turned off is later than a timing when the fourth switching element is turned off, and a timing when the fourth switching element is turned on is later than a timing when the second switching element is turned on.

5. The synchronous rectification mode DC-to-DC converter power supply device according to claim 1, further comprising a sixth switching element being connected in parallel to the first rectifying circuit and driven by the output of the oscillation control circuit.

6. The synchronous rectification mode DC-to-DC converter power supply device according to claim 1, further comprising a first waveform shaping circuit being connected between the first drive circuit and the third switching element, wherein the first waveform shaping circuit includes a first resistor in parallel with a first capacitor.

7. The synchronous rectification mode DC-to-DC converter power supply device according to claim 3, further comprising:

a first waveform shaping circuit being connected between the first drive circuit and the third switching element, and a second waveform shaping circuit being connected between the second drive circuit and the fifth switching element, wherein the first waveform shaping circuit includes a first resistor in parallel with a first capacitor, and wherein the second waveform shaping circuit includes a second resistor in parallel with a second capacitor.

* * * * *

UNITED STATES PATENT AND TRADEMARK OFFICE
CERTIFICATE OF CORRECTION

PATENT NO. : 7,304,459 B2 Page 1 of 1
APPLICATION NO. : 10/538051
DATED : December 4, 2007
INVENTOR(S) : Shuji Kazuma It is certified that error appears in the above-identified patent and that said Letters Patent is hereby corrected as shown below:

Column 9

Line 14 Claim 2, insert -- is -- between "element" and "longer".

Column 10

Line 3 Claim 4, insert -- is -- between "element" and "longer".

Line 4 Claim 4, "elements" should read -- element --.

Signed and Sealed this

Twentieth Day of May, 2008

JON W. DUDAS
*Director of the United States Patent and Trademark Office*